(12) United States Patent
Platner et al.

(10) Patent No.: US 6,186,257 B1
(45) Date of Patent: Feb. 13, 2001

(54) METHOD AND SYSTEM FOR FLOATING A VEHICLE

(75) Inventors: David K. Platner, Shelby; Kurt A. Burmeister, Rochester Hills; Ragnar Ledesma, Sterling Heights, all of MI (US); Steven R. Miller, Louisville, OH (US); Mark P. Reynolds, Birmingham; Monte G. Williams, Royal Oak, both of MI (US); Thomas Hughes, Cheshire (GB)

(73) Assignee: Meritor Heavy Vehicle Systems, Inc., Troy, MI (US)

( * ) Notice: Under 35 U.S.C. 154(b), the term of this patent shall be extended for 0 days.

(21) Appl. No.: 09/418,809

(22) Filed: Oct. 15, 1999

(51) Int. Cl.$^7$ ............................... B60V 1/00; B62D 23/00
(52) U.S. Cl. ........................... 180/116; 180/89.1; 280/5.5
(58) Field of Search .................................. 180/116, 125, 180/89.1; 280/5.5

(56) References Cited

U.S. PATENT DOCUMENTS

| | | | |
|---|---|---|---|
| 3,261,418 | * 7/1966 | Bertin | 180/116 |
| 3,950,038 | * 4/1976 | Wood | 180/125 |
| 4,440,253 | * 4/1984 | Pernum | 180/116 |
| 4,567,957 | * 2/1986 | Johnson | 180/125 |
| 4,673,050 | * 6/1987 | Zschocke | 180/125 |

* cited by examiner

Primary Examiner—Kenneth R. Rice
(74) Attorney, Agent, or Firm—Carlson, Gaskey & Olds

(57) ABSTRACT

A method and system for floating an upper vehicle part from a lower vehicle frame includes a primary floating device, coupled to either the upper vehicle part or the lower vehicle frame, floats the upper vehicle part freely separate from the lower vehicle frame. A plurality of sensors sense appropriate road inputs. An electronic control unit, coupled to the primary floating device and the plurality of sensors, receives the road inputs and generates control signals for controlling the primary floating device in order to minimize movement of the upper vehicle part with respect to the lower vehicle frame.

17 Claims, 2 Drawing Sheets

METHOD AND SYSTEM FOR FLOATING A VEHICLE

BACKGROUND OF THE INVENTION

The invention relates to methods and systems for free-floating upper vehicle parts from lower vehicle frames.

The suspension of a vehicle allows it to drive smoothly over a bumpy road. The wheels may jolt up and down, but springs between the wheel axles and the body of the car flex and take up the force of the jolts. This ensures that the force of the bumping is not transferred to the vehicle cab. Springs alone produce a bouncing motion, so the suspension also contains dampers, commonly known as shock absorbers. These slow the movement of the springs to prevent the vehicle and its occupants bouncing up and down.

Current suspension systems require a rigid mechanical link between the vehicle body and the vehicle frame, as shown very schematically in FIG. 1. Typically, each pair of wheels 10 are coupled together via an axle 12 to form the lower part of the vehicle frame. Of course, vehicles have several axle/wheel sets. The upper vehicle part 14 is then suspended above the wheels 10 and axle 12 via suspension elements 16. The upper vehicle part 14 is typically further mechanically linked to at least one axle 12 via the steering wheel linkage 18, which controls steering of the wheels 10 in response to rotation of steering wheel 20. However, with many of the vehicle systems being converted to electronic controls, such as electronic steering, there is no longer a need for rigid links.

SUMMARY OF THE INVENTION

A method and system for free-floating the vehicle frame from the wheels is disclosed.

A primary floating device is coupled to one of an upper vehicle part and a lower vehicle frame of a vehicle for floating the upper vehicle part freely separate from the lower vehicle frame. A plurality of sensors sense appropriate road inputs. An electronic control unit is coupled to the primary floating device and the sensors for generating control signals based on the sensed road inputs for controlling the primary floating device to minimize movement of the upper vehicle part with respect to the lower vehicle frame. The electronic control unit controls the primary floating device to control a height between the upper vehicle part and the lower vehicle frame.

In one embodiment of the present invention, the primary floating device comprises an air-cushion generating device that provides a cushion of air between the upper vehicle part and the lower vehicle frame. The electronic control unit, in response to the sensed road inputs, controls a height of the air cushion.

In an alternative embodiment, the primary floating device comprises an electromagnetic device that generates an electromagnetic field between the upper vehicle part and the lower vehicle frame. Here, the electronic control unit controls a strength of the electromagnetic field accordingly.

In yet another embodiment, a plurality of the primary floating devices are concentrated at various locations between the upper vehicle part and the lower vehicle frame to provide fast response to the control signals in controlling dynamic forces associated with the vehicle.

These and other features of the present invention can be understood from the following specification and drawings.

DETAILED DESCRIPTION OF A PREFERRED EMBODIMENT

Figure 1:
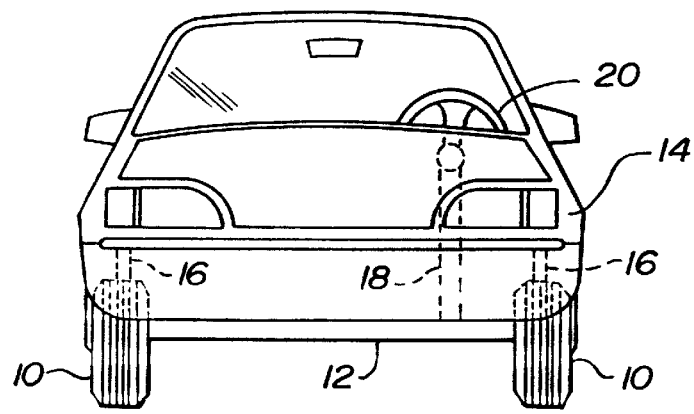
FIG. 1 is a schematic plan view of a conventional vehicle suspension system.
Figure 2:
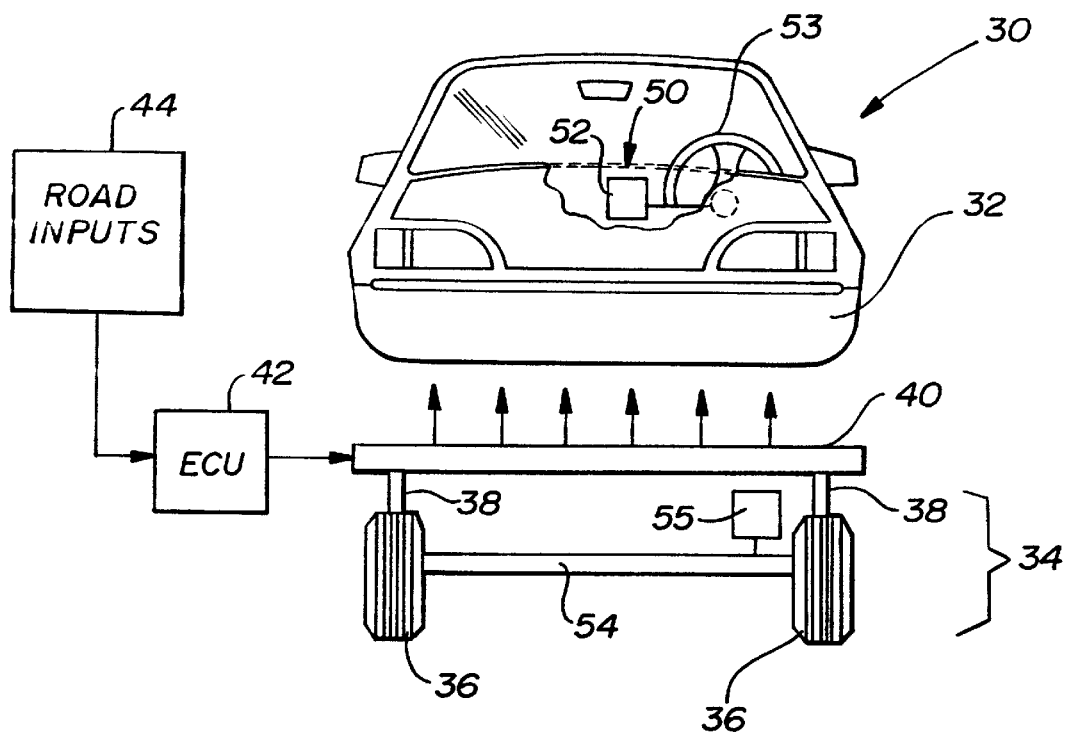
FIG. 2 is a schematic plan view of a the suspension system according to the present invention.

FIG. 2 shows a system 30 incorporating the present invention. The system 30 includes a vehicle having an upper vehicle part 32 and a lower vehicle frame 34, wherein lower vehicle frame 34 consists of wheels 36 and frame member 38. A primary floating device 40 is connected to either one of the lower vehicle frame 34 and the upper vehicle part 32 for creating a varying amount of height between the upper vehicle part 32 and the lower vehicle frame 34 without the use of rigid mechanical links.

Primary floating device 40 may be an air-cushion generating device that generates a varying cushion of air between the upper vehicle part 32 and the lower vehicle frame 34 to free float the upper vehicle part 32 separate from the lower vehicle frame 34. Alternatively, primary floating device 40 may be an electromagnetic device that generates a varying electromagnetic field between the upper vehicle part 32 and the lower vehicle frame 34.

An electronic control unit 42 is coupled to the primary floating device 40 to control the varying height between the upper vehicle part 32 and the lower vehicle frame 34. Electronic control unit 42 generates control signals that control either the height of the air cushion or the strength of the electromagnetic field. The control signals are generated in response to road inputs 44 as sensed by various sensors including, but not limited to, a vehicle speed sensor, a steering wheel angle sensor, and a vertical acceleration sensor.

Figure 3:
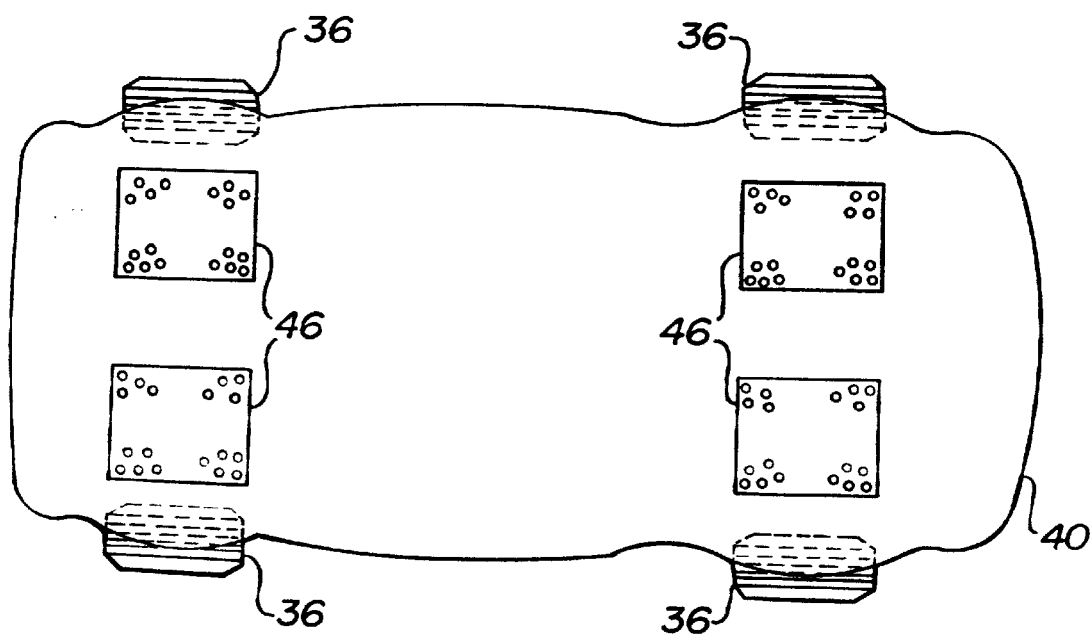
FIG. 3 is a top view of the system of the present invention.

In order to control dynamic forces against the vehicle, such as sudden or extreme movement, a plurality of the primary floating devices 40 are concentrated at various locations 46, as shown in FIG. 3. These concentrated areas 46 provide either higher volumes of air flow or stronger electromagnetic field strength than the rest of the area of the primary floating device 40.

Further, as shown schematically in FIG. 2, the system 30 incorporates a so-called steer-by wire system 50. A sensor and transmitter 52, which may be an RF transmitter, records steering inputs and transmits the inputs from a steering wheel 53 to a steering system receiver and drive 55 associated with axle 54 to turn wheels 36 without any mechanical connection, i.e., a wireless connection. The steering system 50 is shown schematically and is itself known in the art. However, the incorporation of such a system into the free floating system of this application is unique.

Preferred embodiments have been disclosed. However, a worker skilled in this art would recognize that modifications would come within the scope of this invention. Thus, the following claims should be studied to determine the scope and content of this invention.

What is claimed is:

1. In a vehicle having an upper vehicle part and a lower vehicle frame, the upper vehicle part being coupled to the vehicle frame via a non-fixed connection, a method for floating the vehicle comprising:

providing a primary floating device coupled to one of the upper vehicle part and the lower vehicle frame for floating the upper vehicle part freely separate from the lower vehicle frame;

sensing a plurality of road inputs; and generating control signals based on the sensed road inputs for controlling the primary floating device to minimize movement of the upper vehicle part with respect to the lower vehicle frame.

2. The method as recited in claim 1 wherein controlling the primary floating device further includes controlling a height between the upper vehicle part and the lower vehicle frame.

3. The method as recited in claim 1 wherein providing the primary floating device comprises providing a cushion of air between the upper vehicle part and the lower vehicle frame and wherein controlling the primary floating device includes controlling a height of the air cushion.

4. The method as recited in claim 1 wherein providing the primary floating device comprises providing an electromagnetic field between the upper vehicle part and the lower vehicle frame and wherein controlling the primary floating device includes controlling a strength of the electromagnetic field.

5. The method as recited in claim 1 further comprising providing a plurality of the primary floating devices concentrated at a plurality of predetermined locations between the upper vehicle part and the lower vehicle frame to provide fast response to the control signals in controlling dynamic forces associated with the vehicle.

6. In a vehicle having an upper vehicle part and a lower vehicle frame, the upper vehicle part being coupled to the vehicle frame via a non-fixed connection, a system for floating the vehicle comprising:

a primary floating device, coupled to one of the upper vehicle part and the lower vehicle frame, for floating the upper vehicle part freely separate from the lower vehicle frame;

a plurality of sensors for sensing a plurality of road inputs; and an electronic control unit, coupled to the primary floating device and the plurality of sensors, for receiving the road inputs and generating control signals for controlling the primary floating device to minimize movement of the upper vehicle part with respect to the lower vehicle frame.

7. The system as recited in claim 6 wherein the electronic control unit, in controlling the primary floating device, is further operative to control a height between the upper vehicle part and the lower vehicle frame.

8. The system as recited in claim 6 wherein the primary floating device is an air-cushion generating device providing a cushion of air between the upper vehicle part and the lower vehicle frame and wherein the electronic control unit, in controlling the primary floating device, is further operative to control a height of the air cushion.

9. The system as recited in claim 6 wherein the primary floating device is an electromagnetic device providing an electromagnetic field between the upper vehicle part and the lower vehicle frame and wherein the electronic control unit, in controlling the primary floating device, is further operative to control a strength of the electromagnetic field.

10. The system as recited in claim 6 further comprising a plurality of the primary floating devices concentrated at a plurality of predetermined locations between the upper vehicle part and the lower vehicle frame to provide fast response to the control signals in controlling dynamic forces associated with the vehicle.

11. The system associated in claim 6 wherein the vehicle further comprises a steering wheel for steering the vehicle and a drive unit for turning wheels of the vehicle as directed by the steering wheel, and wherein the steering wheel is connected to the drive unit via a wireless connection.

12. A vehicle comprising:

an upper vehicle part;

a lower vehicle frame connected to the upper vehicle part via a non-fixed connection;

a primary floating device for floating the upper vehicle part freely separate from the lower vehicle frame;

a plurality of sensors for sensing a plurality of road inputs; and an electronic control unit, coupled to the primary floating device and the plurality of sensors, for receiving the road inputs and generating control signals for controlling the primary floating device to minimize movement of the upper vehicle part with respect to the lower vehicle frame.

13. The vehicle as recited in claim 12 wherein the electronic control unit, in controlling the primary floating device, is further operative to control a height between the upper vehicle part and the lower vehicle frame.

14. The vehicle as recited in claim 12 wherein the primary floating device is an air-cushion generating device providing a cushion of air between the upper vehicle part and the lower vehicle frame and wherein the electronic control unit, in controlling the primary floating device, is further operative to control a height of the air cushion.

15. The vehicle as recited in claim 12 wherein the primary floating device is an electromagnetic device providing an electromagnetic field between the upper vehicle part and the lower vehicle frame and wherein the electronic control unit, in controlling the primary floating device, is further operative to control a strength of the electromagnetic field.

16. The vehicle as recited in claim 12 further comprising a plurality of the primary floating devices concentrated at a plurality of predetermined locations between the upper vehicle part and the lower vehicle frame to provide fast response to the control signals in controlling dynamic forces associated with the vehicle.

17. The vehicle as recited in claim 12 wherein the upper vehicle part includes a steering wheel for steering the vehicle and the lower vehicle frame includes a drive unit for turning wheels of the vehicle as directed by the steering wheel, wherein the steering wheel is connected to the drive unit via a wireless connection.

* * * * *

UNITED STATES PATENT AND TRADEMARK OFFICE
CERTIFICATE OF CORRECTION

PATENT NO.     : 6,186,257 B1
DATED          : February 13, 2001
INVENTOR(S)    : Platner et al.

It is certified that error appears in the above-identified patent and that said Letters Patent is hereby corrected as shown below:

<u>Title page,</u>
Item [73], Assignee, should read:

-- [73]  Assignee:  Meritor Heavy Vehicle Systems, LLC
                   Troy, MI (US) --

Signed and Sealed this

First Day of June, 2004

JON W. DUDAS
*Acting Director of the United States Patent and Trademark Office*